(12) United States Patent
Kozaki et al.

(10) Patent No.: US 9,506,475 B2
(45) Date of Patent: Nov. 29, 2016

(54) SENSORLESS MAGNETIC LEVITATION VACUUM PUMP AND SENSORLESS MAGNETIC LEVITATION DEVICE

(71) Applicant: SHIMADZU CORPORATION, Kyoto (JP)

(72) Inventors: Junichiro Kozaki, Kyoto (JP); Yoshihiro Nagano, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 387 days.

(21) Appl. No.: 14/370,506

(22) PCT Filed: Dec. 21, 2012

(86) PCT No.: PCT/JP2012/083201
§ 371 (c)(1),
(2) Date: Jul. 3, 2014

(87) PCT Pub. No.: WO2013/103095
PCT Pub. Date: Jul. 11, 2013

(65) Prior Publication Data
US 2014/0377106 A1 Dec. 25, 2014

(30) Foreign Application Priority Data
Jan. 6, 2012 (JP) ................................ 2012-001403

(51) Int. Cl.
| | |
|---|---|
| *F04D 19/04* | (2006.01) |
| *F04D 29/058* | (2006.01) |
| *H02K 7/09* | (2006.01) |
| *F16C 32/04* | (2006.01) |
| *F04D 13/06* | (2006.01) |

(52) U.S. Cl.
CPC ............. *F04D 29/058* (2013.01); *F04D 13/06* (2013.01); *F04D 19/04* (2013.01); *F04D 19/042* (2013.01); *F04D 19/048* (2013.01); *F16C 32/0448* (2013.01); *F16C 32/0489* (2013.01); *H02K 7/09* (2013.01)

(58) Field of Classification Search
CPC .... F04D 19/048; F04D 19/04; F04D 19/042; F04D 29/058; F04D 13/06; H02K 7/09
USPC ............... 310/90.5; 417/423.12, 423.4
See application file for complete search history.

(56) References Cited

U.S. PATENT DOCUMENTS

| | | | | |
|---|---|---|---|---|
| 7,355,833 B2 * | 4/2008 | Kozaki | .................. | G01B 7/144 361/139 |
| 7,525,784 B2 * | 4/2009 | Kozaki | .................... | G05B 5/01 361/139 |

(Continued)

FOREIGN PATENT DOCUMENTS

| | | |
|---|---|---|
| JP | 06-313426 | 11/1994 |
| JP | 2001-140881 | 5/2001 |

(Continued)

OTHER PUBLICATIONS

International Search Report for corresponding International Application No. PCT/JP2012/083201 mailed Mar. 19, 2013.

*Primary Examiner* — Burton Mullins
(74) *Attorney, Agent, or Firm* — Renner, Otto, Boisselle & Sklar, LLP

(57) ABSTRACT

An electromagnet has a core with a pair of magnetic poles, a primary coil wound around the core, and a series circuit of a first auxiliary coil wound around the first magnetic pole of the core, a second auxiliary coil wound around the second magnetic pole of the core, and capacitors, and is connected in parallel to the primary coil and the series circuit. The first and the second magnetic poles are each divided into a plurality of split magnetic poles. The first auxiliary coil is composed of a plurality of split auxiliary coils wound around the respective pole in the plurality of split magnetic poles of the first magnetic pole so that the mutual inductance with the primary coil becomes zero. The second auxiliary coil is composed of a plurality of split auxiliary coils wound around the respective pole in a plurality of split magnetic poles of the second magnetic pole so that the mutual inductance with the primary coil becomes zero.

8 Claims, 12 Drawing Sheets

(56) References Cited

U.S. PATENT DOCUMENTS

| | | | |
|---|---|---|---|
| 7,564,670 B2 * | 7/2009 | Kozaki | F16C 32/0446 361/139 |
| 7,719,151 B2 | 5/2010 | Tremaudant et al. | |
| 2013/0147296 A1 | 6/2013 | Kozaki et al. | |

FOREIGN PATENT DOCUMENTS

| | | | | |
|---|---|---|---|---|
| JP | 2005-076792 | | 3/2005 | |
| JP | 2012-219991 | | 11/2012 | |
| JP | 2013-139870 | * | 7/2013 | F16C 32/04 |

* cited by examiner (a) Circuit diagram (b) Carrier band (f2)

(c) Magnetic levitation control band (f1)

(a)

(b)

SENSORLESS MAGNETIC LEVITATION VACUUM PUMP AND SENSORLESS MAGNETIC LEVITATION DEVICE

TECHNICAL FIELD

The present invention relates to a sensorless magnetically levitation vacuum pump and a sensorless magnetic levitation device, and more particularly to a sensorless magnetic bearing type turbo-molecular pump.

BACKGROUND ART

A turbo-molecular pump, which magnetically levitate a rotor using a superimposed sensorless magnetic levitation device, is adapted to superimpose a carrier having a frequency higher than a frequency band for magnetic levitation control on the driving current of an electromagnet for magnetic levitation and to measure a distance between the electromagnet and the rotor based on the voltage, current, or the like of the modulated carrier signal (e.g., refer to Patent Document 1).

PRIOR ART DOCUMENT

Patent Document

Patent Document 1: JP 6-313426 A

SUMMARY OF THE INVENTION

Problems to be Solved by the Invention

In this regard, reducing the number of turns of a coil to improve coil characteristics for the carrier (e.g., loss due to inductance, distributed capacitance to inductance, etc.) and to increase a carrier current causes a negative effect on the magnetic levitation control where a desired magnetic levitation force cannot be obtained, for example. In that case, an electromagnet current needs to be increased in order to obtain the desired magnetic levitation force, and this leads to a problem that more power is needed for the magnetic levitation. Since a semiconductor manufacturing apparatus or the like is provided with a plurality of vacuum pumps, a power increase in the vacuum pumps results in a power increase in the entire semiconductor manufacturing apparatus, and this is not preferable from the viewpoint of energy saving.

Conversely, if it is attempted to levitate a supported member using a small electromagnet current, the number of turns of an electromagnetic coil is required to be increased. However, an increase in the number of turns of the electromagnetic coil reduces a carrier current component (current component corresponding to a carrier signal) and this makes it difficult to measure the position of the supported member using the carrier. In addition, the degradation of coil characteristics at a high frequency becomes non-negligible.

Solution to the Problems

A sensorless magnetic levitation vacuum pump comprises: a rotor provided with an exhaust function unit; a motor for rotating the rotor; an electromagnet for magnetically levitating the rotor using magnetic force; an electromagnet drive circuit for supplying, to the electromagnet, an electromagnet current including a magnetic levitation control current component for magnetically levitating the rotor and a carrier current component for detecting a levitation position of the rotor, the carrier current component having a higher frequency band than the magnetic levitation control current component; a levitation position detecting circuit for detecting the carrier current component to generate a levitation position signal of the rotor; and a magnetic levitation control circuit for inputting a current command of the magnetic levitation control current component to the electromagnet drive circuit based on the levitation position signal. The electromagnet comprises a core having a pair of magnetic poles; a primary coil wound around the core; and a series circuit of a first secondary coil wound around the first one of the magnetic poles of the core, a second secondary coil wound around the second one of the magnetic poles of the core, and a capacitor, the primary coil and the series circuit being connected in parallel, and each of the first and second magnetic poles is divided into a plurality of divided magnetic poles, the first secondary coil comprising a plurality of split secondary coils wound around the plurality of divided magnetic poles, respectively, of the first magnetic pole so that the mutual inductance with the primary coil becomes zero, and the second secondary coil comprising a plurality of split secondary coils wound around the plurality of divided magnetic poles, respectively, of the second magnetic pole so that the mutual inductance with the primary coil becomes zero.

The first secondary coil has first split secondary coil and second split secondary coil wound in a direction opposite to that of the first split secondary coil, the first split secondary coil and the second split secondary coil being identical in number and being alternately connected in series, and the second secondary coil has third split secondary coil and fourth split secondary coil wound in a direction opposite to that of the third split secondary coil, the third split secondary coil and the fourth split secondary coil being identical in number and being alternately connected in series.

The capacitance C of the capacitor is set so as to satisfy inequalities $(1/2\pi f_1 C) > 2\pi f_1 L_M$ and $(1/2\pi f_2 C) < 2\pi f_2 L_M$, where the inductance of the primary coil, a frequency of the magnetic levitation control current component, and the frequency of the carrier current component are $L_M$, $f_1$, and $f_2$, respectively.

The inductance of the first secondary coil and the second secondary coil connected in series is set to be equal to or less than the inductance of the primary coil.

The impedance $Z_{C1}$ of the capacitor and the impedance $Z_{S1}$ of the first secondary coil and the second secondary coil connected in series, at the frequency $f_1$, are set such that an inequality $Z_{C1} < A^2 \cdot Z_{S1}$ is satisfied, where A is the ratio $f_2/f_1$ of the frequency $f_1$ and the frequency $f_2$.

A sensorless magnetic levitation device comprises: an electromagnet for magnetically levitating a supported member using magnetic force; an electromagnet drive circuit for supplying, to the electromagnet, an electromagnet current including a magnetic levitation control current component for magnetically levitating the supported member and a carrier current component for detecting a levitation position of the supported member, the carrier current component having a higher frequency band than the magnetic levitation control current component; a levitation position detecting circuit for detecting the carrier current component to generate a levitation position signal of the supported member; and a magnetic levitation control circuit for inputting a current command of the magnetic levitation control current component to the electromagnet drive circuit based on the levitation position signal. The electromagnet comprises a core having a pair of magnetic poles; a primary coil wound around the core; and a series circuit of a first secondary coil wound around the first one of the magnetic poles of the core, a second secondary coil wound around the second one of the magnetic poles of the core, and a capacitor, the primary coil and the series circuit being connected in parallel, each of the first and second magnetic poles is divided into a plurality of divided magnetic poles, the first secondary coil comprises a plurality of split secondary coils wound around the plurality of divided magnetic poles, respectively, of the first magnetic pole so that the mutual inductance with the primary coil becomes zero, and the second secondary coil comprises a plurality of split secondary coils wound around the plurality of divided magnetic poles, respectively, of the second magnetic pole so that the mutual inductance with the primary coil becomes zero.

The first secondary coil has first split secondary coil and second split secondary coil wound in a direction opposite to that of the first split secondary coil, the first split secondary coil and the second split secondary coil being identical in number and being alternately connected in series, and the second secondary coil has third split secondary coil and fourth split secondary coil wound in a direction opposite to that of the third split secondary coil, the third split secondary coil and the fourth split secondary coil being identical in number and being alternately connected in series.

The capacitance C of the capacitor is set so as to satisfy inequalities $(1/2\pi f_1 C) > 2\pi f_1 L_M$ and $(1/2\pi f_2 C) < 2\pi f_2 L_M$, where the inductance of the primary coil, a frequency of the magnetic levitation control current component, and the frequency of the carrier current component are $L_M$, $f_1$, and $f_2$, respectively.

Effects of the Invention

The present invention reduce the effect on the magnetic levitation control while at the same time increasing a carrier current component.

DESCRIPTION OF THE EMBODIMENTS

First Embodiment

Figure 1:
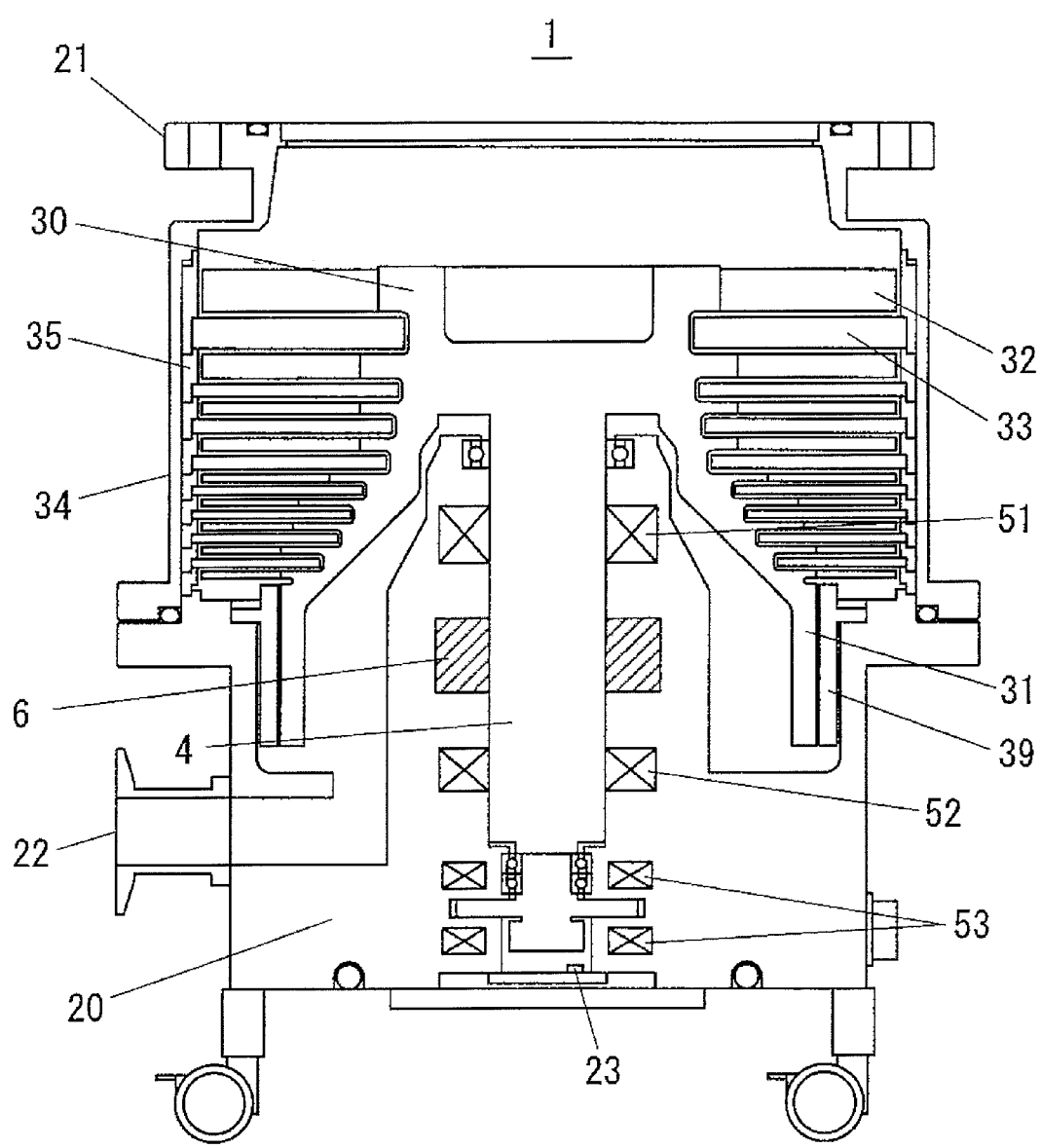
FIG. 1 is a sectional view showing a schematic configuration of a magnetically levitated turbo-molecular pump.

A first embodiment of the present invention will now be described with reference to the drawings. FIG. 1 is a sectional view showing a schematic configuration of a magnetically levitated turbo-molecular pump to which a sensorless magnetic levitation device according to the present invention is applied. The turbo-molecular pump includes a pump unit 1 shown in FIG. 1 and a control unit (not shown) for controlling the pump unit 1. The control unit connected to the pump unit 1 is provided with a magnetic bearing controller, a motor drive controller for rotating a motor 6, and the like.

A rotor 30 is supported by non-contact radial magnetic bearings 51, 52 and an axial magnetic bearing 53 constituting a five-axis controlled magnetic bearing. The rotor 30, which is magnetically and rotatably levitated by the magnetic bearings, is rotated at a high speed by the motor 6. A DC brushless motor is, for example, used for the motor 6. The rotational speed of the rotor 30 is detected by a rotational speed sensor 23.

The rotor 30 is provided with a plurality of stages of rotor blades 32 and a cylindrical screw rotor 31 as an exhaust function unit. On the other hand, a fixed side is provided with a plurality of stages of stationary blades 33 arranged alternately with the rotor blades 32 with respect to the axial direction and a cylindrical screw stator 39 disposed on the outer peripheral side of the screw rotor 31, as the exhaust function unit. Each of the stationary blades 33 is held axially by a pair of spacer rings 35.

A base 20 is provided with an exhaust port 22, to which a back pump is connected. While the rotor 30 is magnetically levitated, a high speed rotation of the motor 6 discharges gas molecules on the inlet 21 side into an exhaust port 22 side.

Figure 2:
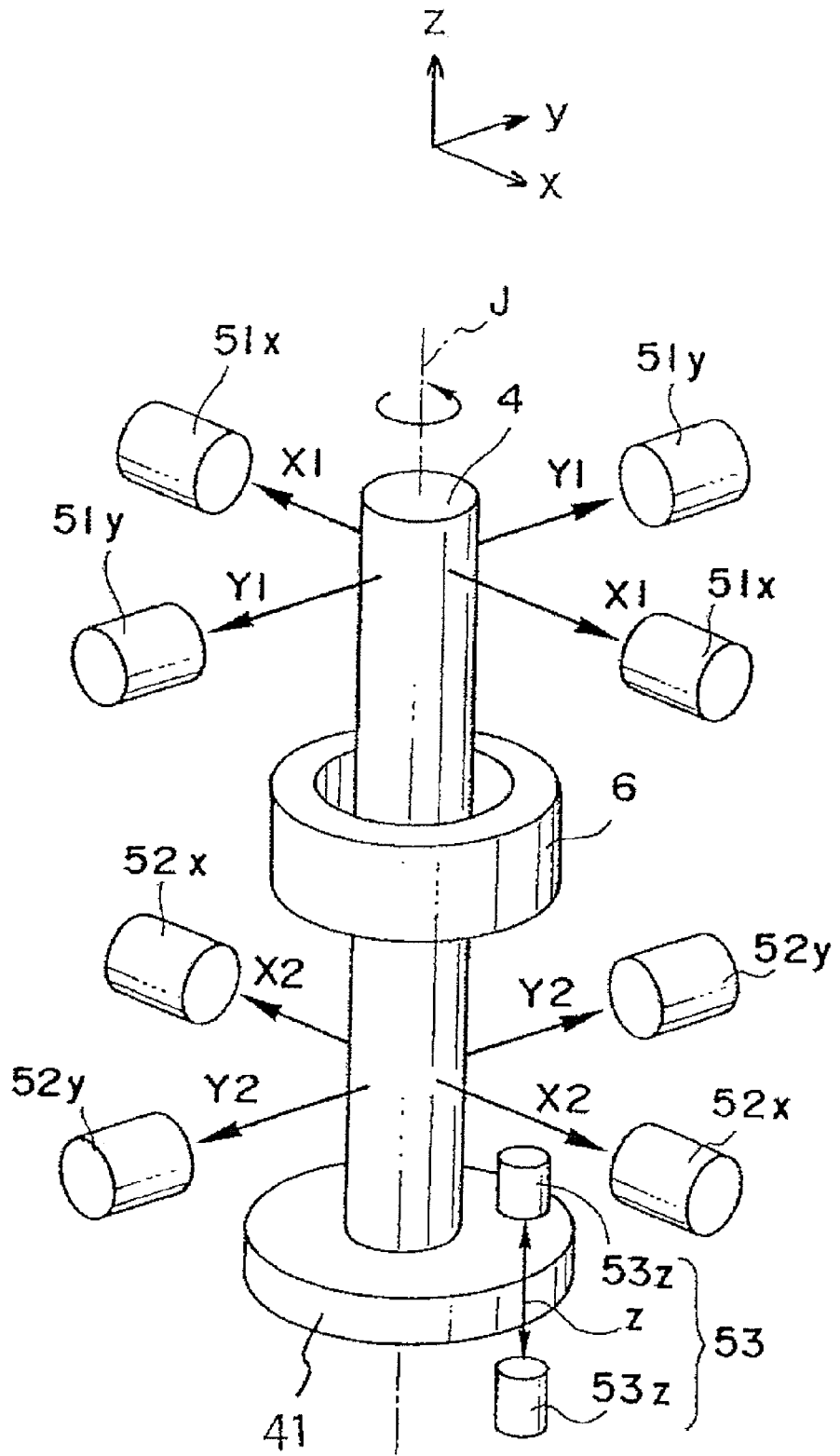
FIG. 2 is a schematic view showing a five-axis controlled magnetic bearing.

FIG. 2 is a schematic view showing a five-axis controlled magnetic bearing, where the axis J of a rotor shaft 4 formed with the rotor 30 coincides with the z-axis. The radial magnetic bearing 51 shown in FIG. 1 includes a pair of electromagnets 51x for the x-axis and a pair of electromagnets 51y for the y-axis. Likewise, the radial magnetic bearing 52 also includes a pair of electromagnets 52x for the x-axis and a pair of electromagnets 52y for the y-axis. The axial magnetic bearing 53 includes a pair of electromagnets 53z arranged in opposition so as to sandwich a disk 41 provided at the lower end of the rotor shaft 4 along the z-axis.

Figure 3:
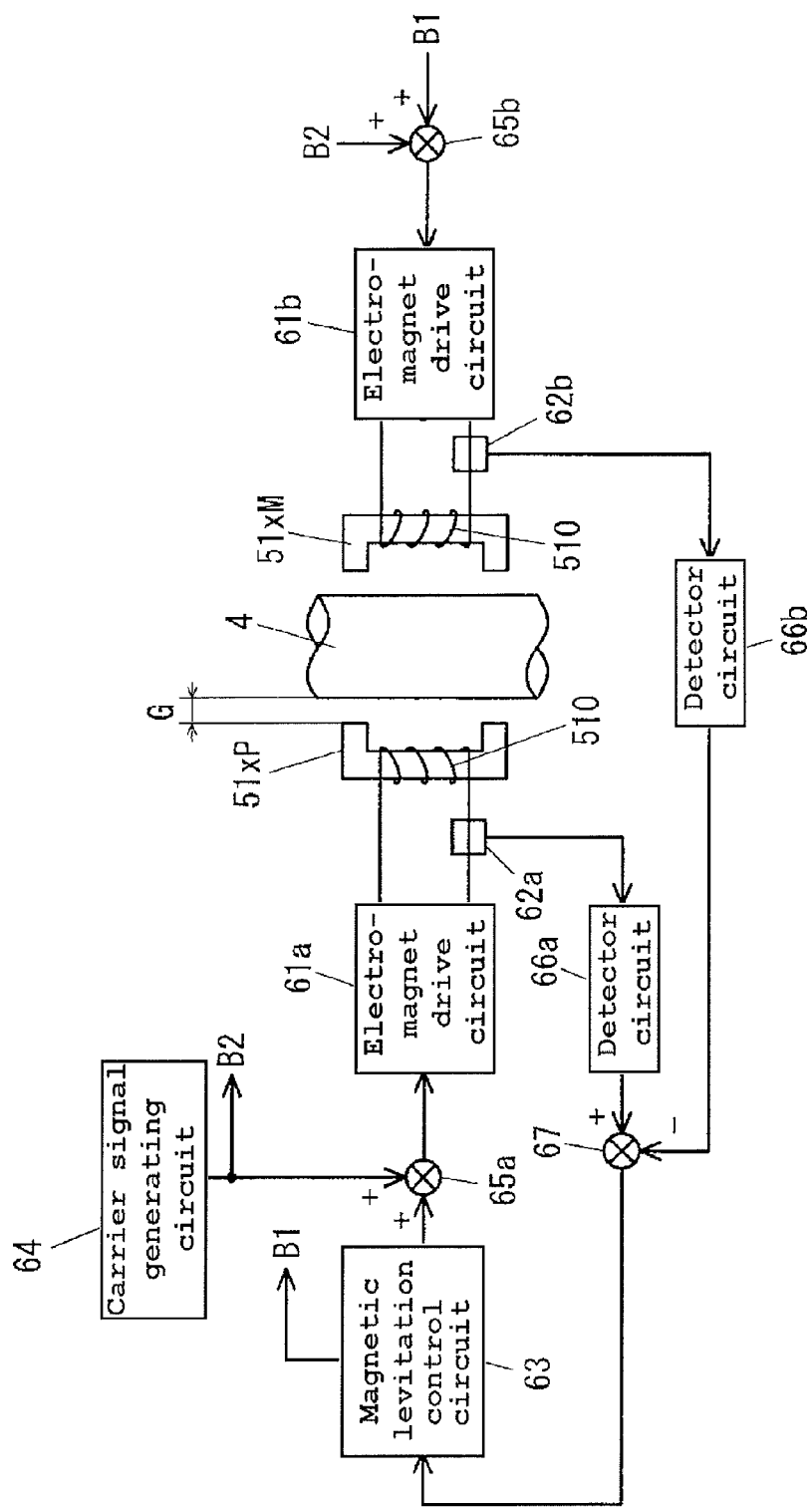
FIG. 3 is a block diagram showing a magnetic levitation device.

FIG. 3 is a diagram showing a part of a controller for controlling the magnetic bearing shown in FIG. 2, which shows one axis of the five axes, specifically the pair of electromagnets 51x. Here, while a differentiator 67 generates a differential signal after signals have passed through both detector circuits 66a, 66b in FIG. 3, a detector circuit may perform detection after the differentiator 67 generates a differential signal based on signals from current detection circuits 62a, 62b (not shown). Given that the pair of electromagnets 51x is an electromagnet 51xP and electromagnet 51xM, they are arranged so as to interpose the rotor shaft 4 therebetween. Each of the electromagnet 51xP and electromagnet 51xM is provided with an electromagnetic coil 510 wound therearound. The present embodiment is characterized by the configuration of the electromagnetic coil 510. The details of the electromagnetic coil 510 are described later. Other configurations are similar to those of a conventional sensorless magnetic levitation device, and detailed descriptions are omitted here.

An electromagnet drive circuit 61a supplies an electromagnet current to the electromagnet 51xP, and an electromagnet drive circuit 61b supplies an electromagnet current to the electromagnet 51xM. The electromagnet drive circuits 61a, 61b are identically configured. In the sensorless magnetic levitation device of the embodiment, the electromagnet current supplied to the electromagnets 51xP, 51xM includes a magnetic levitation control current component for levitating the rotor 30 in a predetermined place using magnetic force of the electromagnets 51xP, 51xM and a carrier current component for detecting a levitation position of the rotor shaft 4. The frequency band of the carrier current component is set higher than that of the magnetic levitation control current component. For example, the frequency band of the magnetic levitation control current component is set to a few kHz (1 to 2 kHz), and the frequency band of the carrier current component is set to 10 kHz.

Since the inductance of the electromagnetic coil 510 varies as a gap G between the rotor shaft 4 and the electromagnets 51xP, 51xM varies, the magnetic levitation device of the embodiment detects a change in the inductance as an amplitude change of the carrier current component and uses it to control a levitation position of the rotor shaft 4. Currents flowing through the electromagnets 51xP, 51xM are detected by the current detection circuits 62a, 62b. Current detection signals from the current detection circuits 62a, 62b are input to the detector circuits 66a, 66b, respectively. The detector circuits 66a, 66b extract the carrier current components from the current detection signals to generate position signals based on their modulated signals.

The differentiator 67 generates a difference signal between the position signals (gap signals) from detector circuits 66a, 66b. For example, when the rotor shaft 4 is levitated at an intermediate position of the electromagnet 51xP and the electromagnet 51xM, i.e., at the center position of the magnetic bearings, the difference signal becomes zero. Given that the difference signal is a negative value, for example, when the rotor shaft 4 gets closer to the electromagnet 51xP side, the difference signal becomes, on the contrary, a positive value when the rotor shaft 4 gets closer to the electromagnet 51xM.

The difference signal from the differentiator 67 is fed back to a magnetic levitation control circuit 63. The magnetic levitation control circuit 63 outputs a current command signal to control the magnetic levitation control current component based on the difference signal fed back and a position command. An adder 65a adds/superimposes a carrier signal generated by a carrier signal generating circuit 64 to/on the current command signal. The electromagnet drive circuit 61a supplies the electromagnet current based on a signal obtained by adding to the electromagnet 51xP. On the other hand, an adder 65b associated with an opposing electromagnet 51xM also adds a current command signal from the magnetic levitation control circuit 63 and the carrier signal generated by a carrier signal generating circuit 64, and a signal obtained by adding is input to the electromagnet drive circuit 61b. For example, if the current command signal to the electromagnet 51xP is a command to increase a current, the current command signal to the electromagnet 51xM becomes a command to decrease a current.

Incidentally, a conventional sensorless magnetic levitation device supplies an electromagnet current to a single electromagnetic coil 510 and detects a modulated carrier current component signal superimposed on the electromagnet current, and this results in the problem described above. In the embodiment, an electromagnetic coil 510 thus includes a primary coil for magnetic levitation control and a secondary coil for levitation position detection, where a magnetic levitation control current component flows through the primary coil and a carrier current component flows through the secondary coil as well as through the primary coil, both current components being included in an electromagnet current, thereby reducing the effect on the magnetic levitation control while at the same time increasing the carrier current component.

Figure 4:
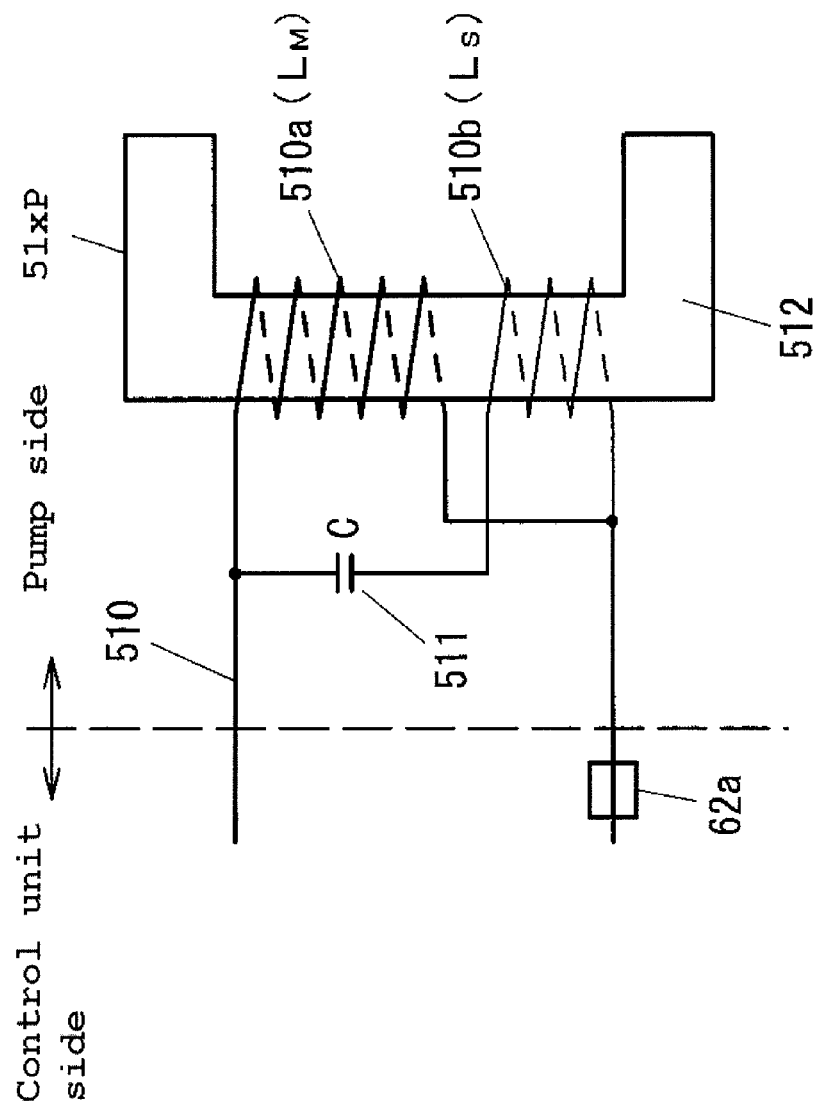
FIG. 4 is a diagram showing the details of an electromagnetic coil 510 wound around a core 512 of an electromagnet 51xP.

A configuration that increases the carrier current component is first described. FIG. 4 is a diagram showing the details of an electromagnetic coil 510 wound around a core 512 of the electromagnet 51xP. The electromagnetic coil 510 of the electromagnet 51xM is also similar to that of the electromagnet 51xP, and the electromagnetic coil 510 is described herein with reference to the electromagnet 51xP. The electromagnetic coil 510 includes a circuit connected in series with a secondary coil 510b and a capacitor 511 in addition to a conventional primary coil 510a. The primary coil 510a and the secondary coil 510b are wound around the core 512, and a series circuit of the secondary coil 510b and the capacitor 511 is connected in parallel with the conventional primary coil 510a.

The number of turns of the secondary coil 510b is set to be equal to or less than the number of turns of the primary coil 510a, and the inductance $L_M$ of the primary coil 510a and the inductance $L_S$ of the secondary coil 510b are set as $L_M L_S$. Furthermore, the capacitance C of the capacitor 511 is set such that the impedance of the capacitor 511 is larger than the impedance of the primary coil 510a in the frequency band of the magnetic levitation control current component and it is smaller than the impedance of the primary coil 510a in the frequency band of the carrier current component. That is, the capacitance C is set so as to satisfy the following inequalities (1) and (2), where the magnetic levitation control current component has a frequency of $f_1$ and the carrier current component has a frequency of $f_2$.

$$(1/2\pi f_1 C) > 2\pi f_1 L_M \qquad (1)$$

$$(1/2\pi f_2 C) < 2\pi f_2 L_M \qquad (2)$$

For example, the case where the frequency $f_1=1$ kHz and the frequency $f_2=10$ kHz, and the impedance $Z_{M1}$ of the primary coil 510a and the impedance $Z_{S1}$ of the secondary coil 510b during the magnetic levitation control ($f_1=1$ kHz) are $Z_{M1}=Z$ and $Z_{S1}=0.7Z$, respectively is considered. Since $f_2=10 \cdot f_1$ as described above, the impedances $Z_{M2}$ and $Z_{S2}$ of the primary coil 510a and the secondary coil 510b to the carrier current component are $Z_{M2}=10Z$ and $Z_{S2}=7Z$, respectively. On the other hand, the respective impedances $Z_{C1}$ and $Z_{C2}$ of the capacitor 511 at the frequencies $f_1$ and $f_2$ have a relationship of $Z_{C1}=10 Z_{C2}$.

Figure 5:
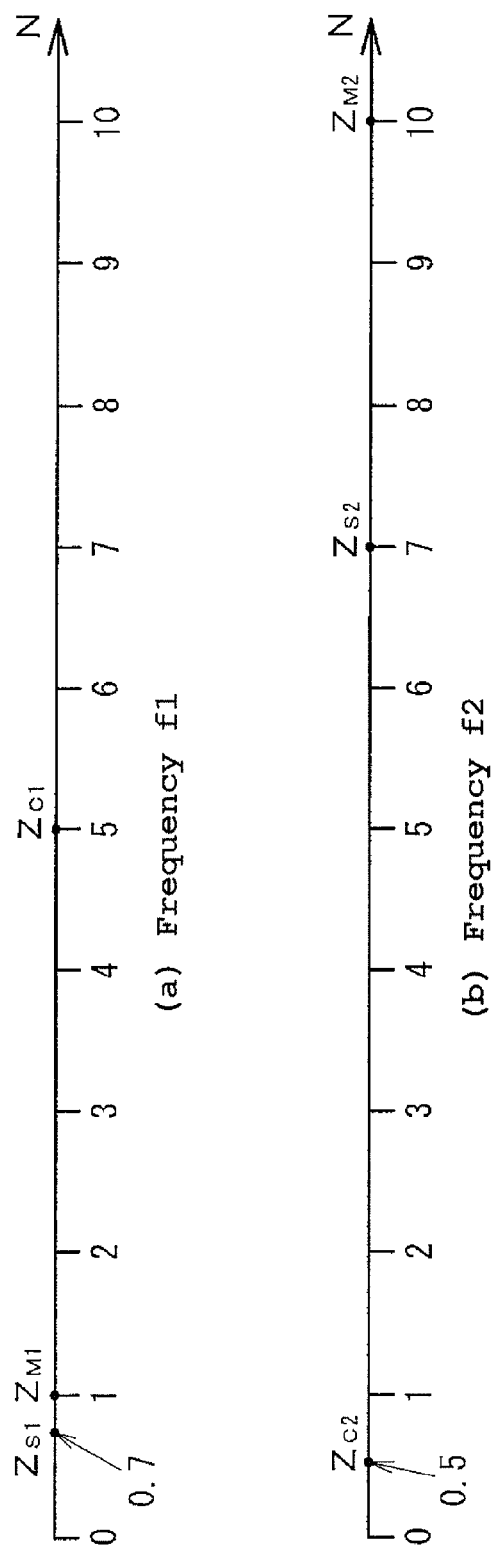
FIG. 5 is a diagram showing the magnitude relation of impedance.

Accordingly, setting the impedance $Z_{C1}$ of the capacitor 511 at the frequency $f_1$ so that $Z_{C1}=5Z$ results in that $Z_{C2}=0.5Z$, where $Z_{C1}$ (=5Z)>$Z_{M1}$ (=Z) and $Z_{C2}$ (=0.5Z) <$Z_{M2}$ (=10Z), and thus the above inequalities (1) and (2) are satisfied. FIG. 5 represents the impedances $Z_{M1}$, $Z_{S1}$, and $Z_{C1}$ at the frequency $f_1$ and the impedances $Z_{M2}$, $Z_{S2}$, and $Z_{C2}$ at the frequency $f_2$ on number lines, thereby showing their magnitude relation clearly. Horizontal axes are N when impedance is represented as N·Z.

FIG. 6(a) is a circuit diagram of the electromagnetic coil 510, FIG. 6(b) shows an equivalent circuit for the carrier current component, and FIG. 6(c) shows an equivalent circuit for the magnetic levitation control current component. In the frequency band ($f_1$) of the magnetic levitation control current component, the impedance $Z_{C1}$ of the capacitor 511 is set to be larger than the impedance $Z_{M1}$ of the primary coil 510a as shown in FIG. 5(a). Therefore, a winding circuit can be represented approximately by the equivalent circuit of FIG. 6(c), and the magnetic levitation control current component hardly flows through the line of the secondary coil 510b to which the capacitor 511 is connected. Accordingly, the impedance $Z_T$ of the entire winding circuit is approximately equal to the impedance $Z_M$ (=$j\omega L_M$) of the primary coil 510a in the frequency band ($f_1$) for the magnetic levitation control.

On the other hand, the impedance $Z_{C2}$ of the capacitor 511 is set to be smaller than the impedance $Z_{M2}$ of the primary coil 510a in the frequency band including the frequency $f_2$ of the carrier current component as shown in FIG. 5(b), and this allows the carrier current component to flow through the line of the secondary coil 510b as well as the line of the primary coil 510a. In addition, since the impedance $Z_{C2}$ of the capacitor 511 is smaller than the impedance $Z_{S2}$ of the secondary coil 510b in the frequency band of the carrier current component, it is possible to consider the equivalent circuit shown in FIG. 6 (b) for the carrier current component.

Referring now to FIG. 5, if $f_2 = A \times f_1$, it becomes understood that setting the inductance $L_S$ of the secondary coil 510b and the capacitance C of the capacitor 511 so that $Z_{C1} < A^2 \times Z_{S1}$ satisfies $Z_{C2} < Z_{S2}$. That is, the impedance of the capacitor 511 can be set to be smaller than that of the secondary coil 510b, thereby considering the entire winding circuit as the equivalent circuit such as shown in FIG. 6(b). Such a setting satisfies the inequalities (1) and (2) while at the same time being able to set the impedance of the entire winding circuit smaller.

In the case of the equivalent circuit of FIG. 6(b), the impedance $Z_T$ of the entire winding circuit can be represented by the following equation (3), where M is the mutual inductance between the primary coil 510a and the secondary coil 510b.

$$Z_T = j\omega \cdot (L_M \times L_S - M^2)/(L_M + L_S - 2M) \quad (3)$$

Since $L_M \cdot L_S > M^2$ and $(L_M + L_S) > 2M$ are typically satisfied, the impedance $Z_T$ of the entire winding circuit becomes a value shown in equation (5) in the case of setting according to the following equation (4), for example:

$$L_M = L, L_S = 0.7L, M = 0.8L \quad (4)$$

$$Z_T = 0.6 j\omega L \quad (5)$$

As shown in the equation (5), the impedance $Z_T$ of the entire winding circuit to the carrier current component is small compared with the conventional primary coil alone in the embodiment. The current detection circuits 62a shown in FIG. 4 detects not only the carrier current component flowing through the secondary coil 510b but also the carrier current component flowing through the primary coil 510a, and both carrier current components can be used for detecting a rotor position. That is, a distance between an electromagnet and an object to be levitated can be measured based on the change in the impedance of an entire winding wire. Thus, the present embodiment can increase the carrier current component flowing through the electromagnetic coil 510 more than ever and can improve the S/N ratio of a signal fed back to the magnetic levitation control circuit 63.

In addition, since substantially only the carrier current component flows through the secondary coil 510b as described above, the winding wire of the secondary coil 510b can be thinner than that of the primary coil 510a. Accordingly, the space for winding the secondary coil 510b on the core 512 may be reduced. Although an electromagnet portion forms a parallel circuit constituting the primary coil 510a and the secondary coil 510b as shown in FIG. 4, a portion to pull from a pump body to an atmosphere side has two lead lines as in the conventional way, and thus there is no need to change a connector for connection between vacuum and atmosphere.

Figure 7:
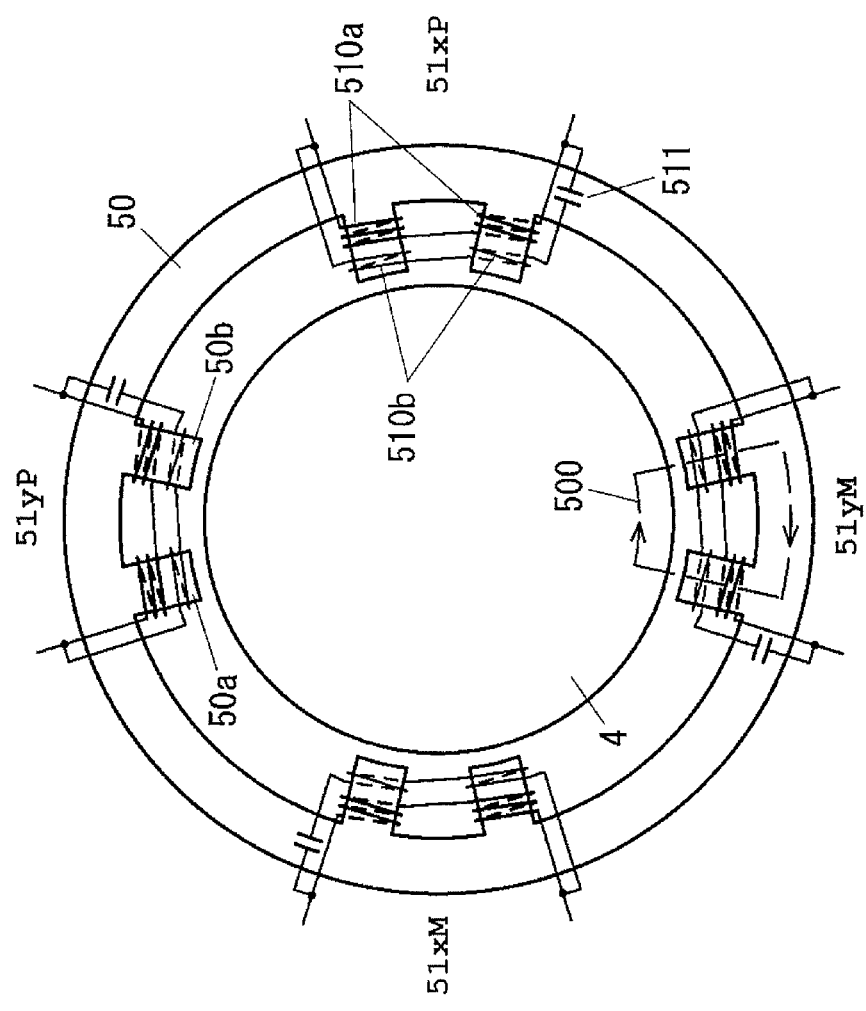
FIG. 7 is a diagram showing electromagnets 51xP, 51xM, 51yP, and 51yM for use in a ring-shaped core 50.

While the electromagnet 51xP shown in FIG. 4 uses a U-shaped core 512, a ring-shaped core 50 shown in FIG. 7 may be used. The core 50 is provided with four sets of pairs of magnetic poles 50a and 50b protruding inside and each of electromagnets 51xP, 51xM, 51yP, and 51yM is formed with the pair of magnetic poles 50a and 50b. Each of the magnetic poles 50a, 50b is wound with the primary coil 510a and the secondary coil 510b. The primary coils 510a of the magnetic poles 50a, 50b are connected in series so that magnetic flux occurs as shown by the broken line 500. Likewise, the secondary coils 510b of the magnetic poles 50a, 50b are connected in series so that magnetic flux occurs as shown by the broken line 500.

Here, as described above, in the case of the winding circuit shown in FIG. 4, the impedance $Z_T$ of the entire winding circuit is represented by the equation (3) in a carrier band. As such, the rate of change of the impedance $Z_T$ to a change in the distance between the core 512 and the rotor shaft 4 as an object to be levitated is smaller than the rate of change of the impedance of the conventional configuration with only the primary coil 510a, and this reduces position detection sensitivity. Thus, a winding circuit configuration such as shown in FIG. 8 increases the carrier current component more than ever and prevents desensitization.

Figure 8:
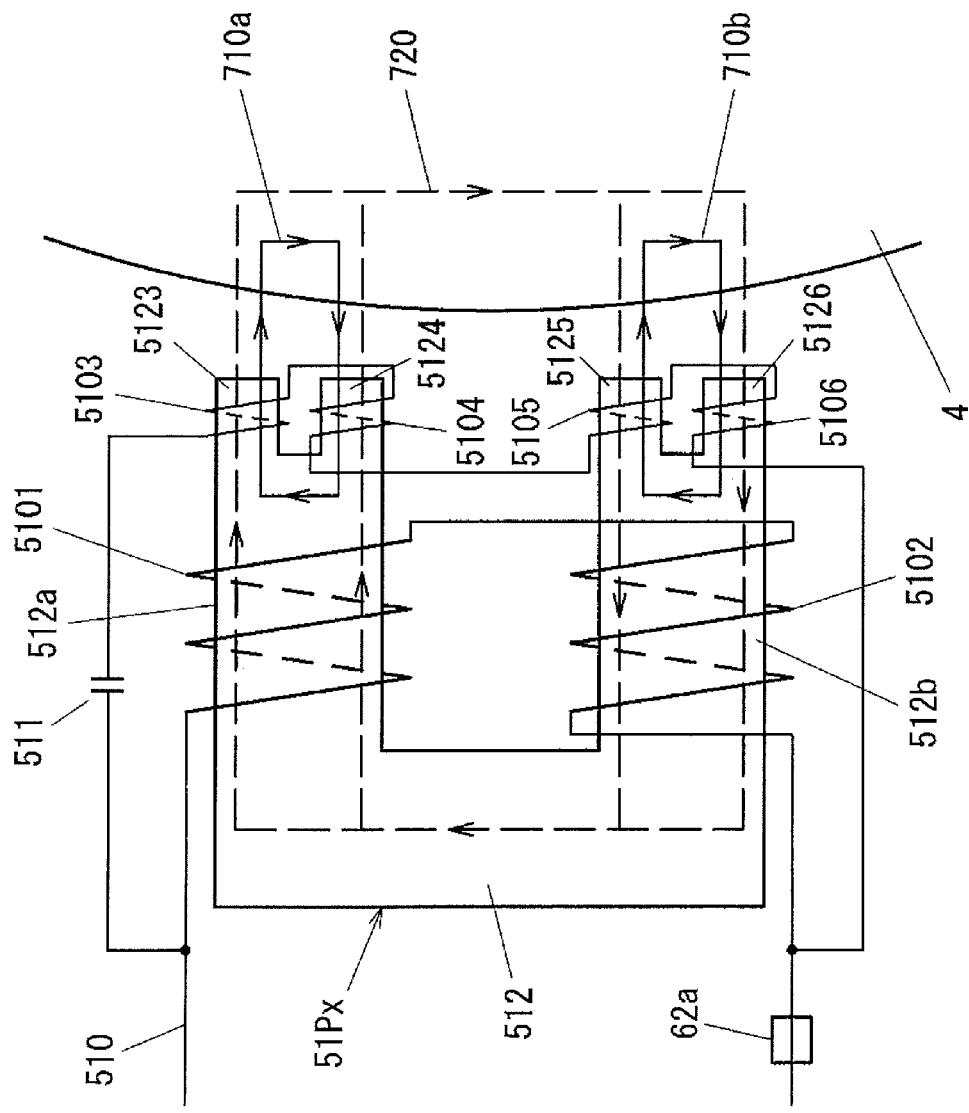
FIG. 8 is a diagram showing an exemplary configuration that reduces the mutual inductance between a primary coil and a secondary coil.

FIG. 8 illustrates an exemplary configuration whereby the mutual inductance between the primary coil and the secondary coil is reduced, i.e., the mutual inductance becomes approximately zero. The components that are the same as the components of FIG. 4 are denoted by the same reference numerals. In the embodiment shown in FIG. 8, the primary coil has two split primary coils 5101 and 5102 connected in series to each other, and the secondary coil has four split secondary coils 5103, 5104, 5105, and 5106. The split primary coils 5101, 5102 connected in series correspond to the primary coil 510a of FIG. 4, and the split secondary coils 5103, 5104, 5105, 5106 correspond to the secondary coil 510b of FIG. 4.

The tip portion of each of magnetic poles 512a and 512b is provided with a groove by which a tip portion is divided into two. Consequently, the tip of the magnetic pole 512a is provided with divided magnetic poles 5123 and 5124, and the tip of the magnetic pole 512b is provided with divided magnetic poles 5125 and 5126. The split secondary coils 5103, 5104, 5105, and 5106 are wound around the divided magnetic poles 5123, 5124, 5125, and 5126, respectively.

Two split secondary coils 5103, 5104 provided on the magnetic pole 512a are connected in series so that magnetic flux 710a shown by the solid line is formed. That is, the split secondary coils 5103, 5104 are wound so that currents flow in opposite directions to each other when viewed from a distal end. The magnetic flux 710a emerging from the divided magnetic pole 5123 flows into the divided magnetic pole 5124 after it has flowed into the rotor shaft 4, and then returns to the split secondary coil 5103 through the magnetic pole 512a. In other words, the magnetic flux 710a forms a closed loop that flows through the divided magnetic pole 5123, the rotor shaft 4, and the divided magnetic pole 5124 and is closed within the magnetic pole 512a.

Two split secondary coils 5105, 5106 provided on the magnetic pole 512b are connected in series so that magnetic flux 710b shown by the solid line is formed. That is, the split secondary coils 5105, 5106 are wound so that current flows in opposite directions to each other when viewed from a distal end. The magnetic flux 710b emerging from the divided magnetic pole 5125 flows into the divided magnetic pole 5126 after it has flowed into the rotor shaft 4, and then returns to the split secondary coil 5106 through the magnetic pole 512b. In other words, the magnetic flux 710b forms a closed loop that flows through the divided magnetic pole 5125, the rotor shaft 4, and the divided magnetic pole 5126 and is closed within the magnetic pole 512b.

The split primary coil 5101 is wound around the magnetic pole 512a of the core 512, and the split primary coil 5102 is wound around the magnetic pole 512b. These two split primary coils 5101, 5102 are connected in series so that magnetic flux 720 shown by the broken line is formed. The magnetic flux 720 produced by the split primary coils 5101, 5102 forms a magnetic path that flows through the split secondary coils 5103, 5104 and into the rotor shaft 4 after emerging from the split primary coil 5101, then flows through the split secondary coils 5105, 5106 and the split primary coil 5102, and returns to the split primary coil 5101.

The direction of the magnetic flux 720 flowing into the split secondary coils 5103, 5104 is the same as shown in FIG. 8, while the split secondary coils 5103, 5104 are wound so that currents flow in opposite directions to each other as described above. Therefore, induced electromotive forces to a change in the magnetic flux 720 are oppositely directed in the split secondary coils 5103 and 5104. The same applies to the relationship between the magnetic flux 720 and the split secondary coils 5105, 5106. Accordingly, the effect of the magnetic flux 720 on the split secondary coils 5103, 5104 can be zero by appropriately setting the magnetic path cross-sectional areas of the divided magnetic poles 5123, 5124. Likewise, the effect of the magnetic flux 720 on the split secondary coils 5105, 5106 can be zero by appropriately setting the magnetic path cross-sectional areas of the divided magnetic poles 5125, 5126.

In other words, the mutual inductance M between the split primary coils 5101, 5102 and the split secondary coils 5103, 5104, 5105, 5106 can be zero in the configuration of FIG. 8. For example, when the density of the magnetic flux 720 at the tip portions of the magnetic poles 512a, 512b is uniform, each of magnetic pole tips may be divided into two so that the cross-sectional areas of the divided magnetic poles 5123 and 5124 are equal and the cross-sectional areas of the divided magnetic poles 5125 and 5126 are equal.

Figure 6:
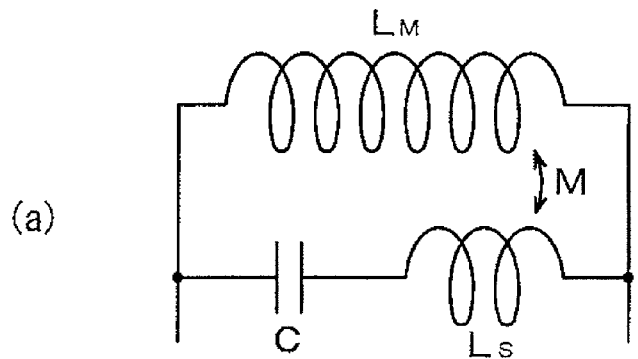
FIGS. 6(a) to 6(c) are diagrams for explaining the electromagnetic coil 510.
Figure 6:
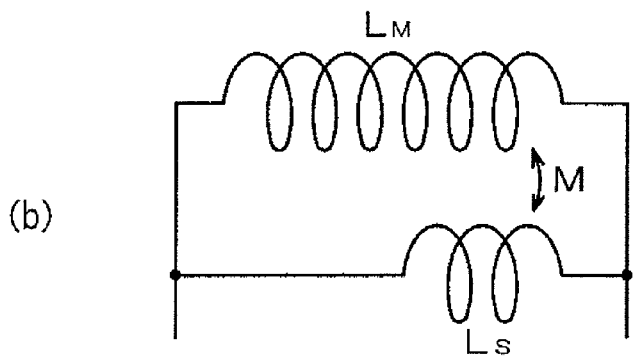
Figure 6:
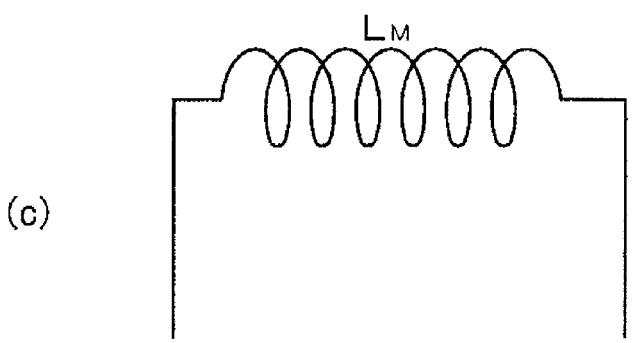

In the configuration shown in FIG. 8, the primary coil identified by the inductance $L_M$ of FIG. 6 is replaced with a series circuit of the split primary coils 5101 and 5102 shown in FIG. 8, and the secondary coil identified by the inductance $L_S$ of FIG. 6 is replaced with a series circuit of the split secondary coils 5103, 5104, 5105, and 5106, where the mutual inductance M becomes zero.

Here, the rates of change of the impedance $Z_T$ to a change in the distance are compared to the conventional configuration provided with only the primary coil, the configuration shown in FIG. 4, and the configuration shown in FIG. 7. The following description is made using the absolute value of impedance Z (that is referred by the same symbol Z). The relationship between impedance Z (absolute value) and inductance L is: $Z=\omega L$ (where $\omega$=carrier frequency×2n), the impedance Z being proportional to the inductance L. Since $\omega$ is treated here as a constant, the following is described with reference to a change in the inductance instead of a change in the impedance.

Next, D is a distance between the rotor shaft 4 and the electromagnet 51xP at a target levitation position, D+dn is a distance when the rotor shaft 4 has approached the electromagnet 51xP from the target levitation position, and D+df is a distance, conversely, when the rotor shaft 4 has moved away, where dn is a negative value and df is a positive value. Since the inductance L is inversely proportional to the first power of the distance, an inductance Ln at a distance (D+dn) and an inductance Lf at a distance (D+df) are represented by the following equations (6) and (7), where L0 is an inductance at the target levitation position.

$$Ln=L0\times D/(D+dn) \quad (6)$$

$$Lf=L0\times D/(D+df) \quad (7)$$

Now, the rate of change ΔL of the inductance L due to a change in the distance is represented by the following equation (8). The mutual inductance M between a winding wire with self-inductance L1 and a winding wire with self-inductance L2 is represented by the following equation (9). Here, a coupling degree k has a value of 0 to 1 where k tends to be greater when a distance is closer (i.e., an air gap is smaller), and conversely, k tends to be smaller when a distance is greater (i.e., an air gap is wider).

$$\Delta L=(Ln-Lf)/(Ln+Lf) \quad (8)$$

$$M=k\sqrt{(L1\times L2)} \quad (9)$$

Assuming $L_M=L$, $L_S=0.7L$, and M=0.8L as an example, the rate of change is calculated as follows for each of the inductance in the case of the primary coil only, the total inductance of the primary coil and the secondary coil in the case of M≠0, and total inductance in the case of M=0.

(In case of primary coil only) In the case of only a conventional primary coil being provided, an inductance $Ln_M$ at a distance (D+dn) and an inductance $Lf_M$ at a distance (D+df) correspond to those where L0 are replaced with $L_M$ in the equations (6) and (7), respectively. By substituting those equations into the equation (8), the rate of change $\Delta L_M$ of the inductance in the case of the primary coil only is represented by the equation (10):

$$\Delta L_M=(Ln_M-Lf_M)/(Ln_M+Lf_M)=\{D/(D+dn)-D/(D+df)\}/\{D/(D+dn)+D/(D+df)\}=(df-dn)/(2D+df+dn) \quad (10)$$

Here, assuming kn=0.98 and kf=0.94 as a coupling degree kn and kf at the distance (D+dn) and the distance (D+df), respectively, one can obtain $\Delta L_M \approx 0.43$ from the equation (10), where D=350×10⁻⁶ (m), df=150×10⁻⁶ (m), and dn=−150×10⁻⁶ (m).

(In case of total inductance of the primary coil and the secondary coil) The total inductance LT of the primary coil and the secondary coil includes the mutual inductance M as shown by the equation (11), which is deformed using $L_M=L$ and $L_S=0.7L$ in the equation (11). The mutual inductances Mn and Mf at the distance (D+dn) and the distance (D+df) are represented by the equations (12) and (13), respectively, using the equation (9), $L_M=L$, and $L_S=0.7L$.

$$LT=(L_M\times L_S-M^2)/(L_M+L_S-2M)=(0.7L^2-M^2)/(1.7L-2M) \quad (11)$$

$$Mn=\sqrt{(0.7)}\cdot kn\cdot L\cdot D/(D+dn) \quad (12)$$

$$Mf=\sqrt{(0.7)}\cdot kf\cdot L\cdot D/(D+df) \quad (13)$$

An inductance LTn at the distance (D+dn) can be obtained by substitution of Mn of the equation (12) into the equation (11), and an inductance LTf at the distance (D+df) can be obtained by substitution of Mf of the equation (13) into the equation (11). The rate of change ΔLT of the total inductance LT can be obtained by substitution of the LTn and LTf into Ln and Lf of the equation (8), respectively. By computing ΔLT using kn=0.98, kf=0.94, D=350×10⁻⁶ (m), df=150× 10⁻⁶ (m), and dn=−150×10⁻⁶ (m), ΔLT≈0.28 can be obtained.

Since the equation (11) is such as shown in the equation (14) in the case of the mutual inductance M=0, the total inductances LTn and LTf at the distance (D+dn) and the distance (D+df) are such as shown in equations (15) and (16), respectively. Consequently, the rate of change ΔLT is the same as the equation (10) as shown in the equation (17), and ΔLT≈0.43 can be obtained.

$$LT=(0.7/1.7)L \quad (14)$$

$$LTn=(0.7/1.7)L \cdot D/(D+dn) \quad (15)$$

$$LTf=(0.7/1.7)L \cdot D/(D+df) \quad (16)$$

$$\Delta LT=(LTn-LTf)/(LTn+LTf)=\{D/(D+dn)-D/(D+df)\}/\{D/(D+dn)+D/(D+df)\}=(df-dn)/(2D+df+dn) \quad (17)$$

Thus, the rate of change of the total inductance is 0.43 in the case of the primary coil only (i.e., conventional case) and it is reduced to 0.28 in the case of providing the secondary coil 510b as shown in FIG. 4 and M≠0. That is, the sensitivity to a change in the distance is reduced. However, when the mutual inductance M between the secondary coil and the primary coil is set to be zero by the configuration shown in FIG. 7, the rate of change of the total inductance becomes 0.43, identical to that in the case of the primary coil only, thereby preventing desensitization. Thus, the provision of the secondary coil can increase a carrier component more than ever and can also improve the signal-to-noise ratio of position detection.

Figure 9:
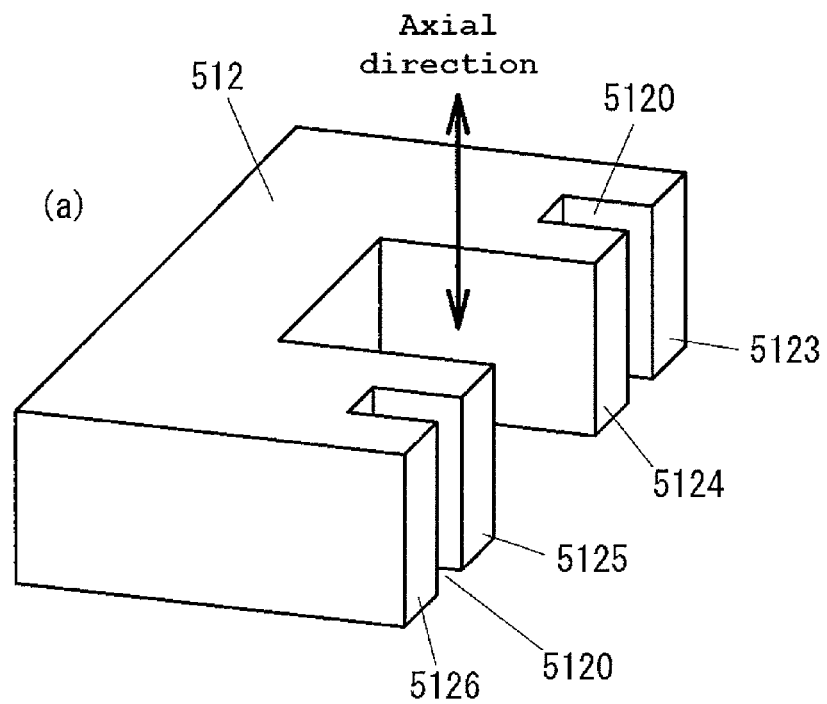
FIGS. 9(a) and 9(b) are diagrams showing a modification of a pole tip structure.
Figure 9:
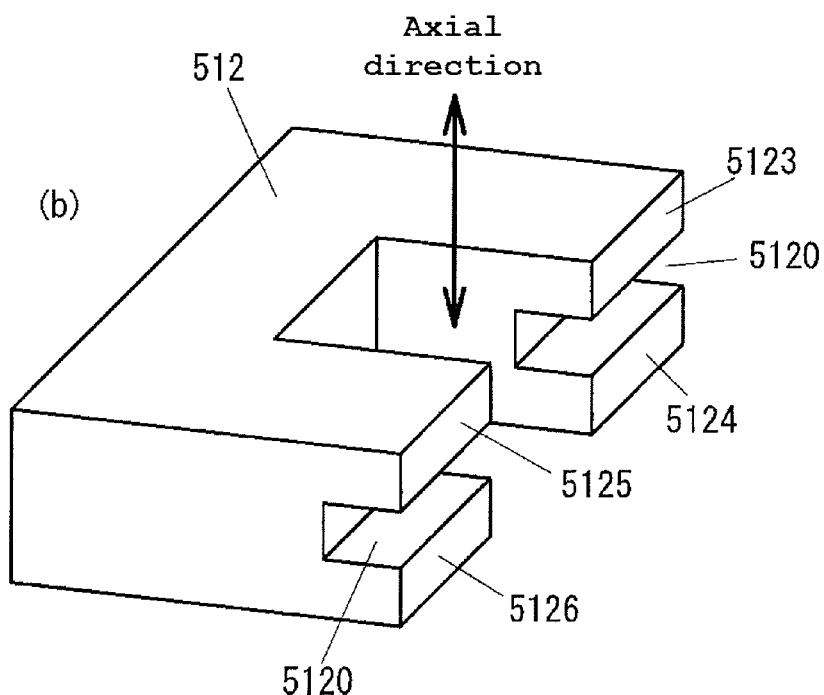

In the example shown in FIG. 8, a groove 5120 provided on the tip of each of the magnetic poles 512a and 512b is formed in the axial direction of the rotor shaft 4 as shown in FIG. 9(a). However, the divided magnetic poles 5123, 5124 and the divided magnetic poles 5125, 5126 may be arranged in the axial direction by the formation of the grooves 5120 in the direction perpendicular to the axial direction as shown in FIG. 9(b).

Second Embodiment

Figure 10:
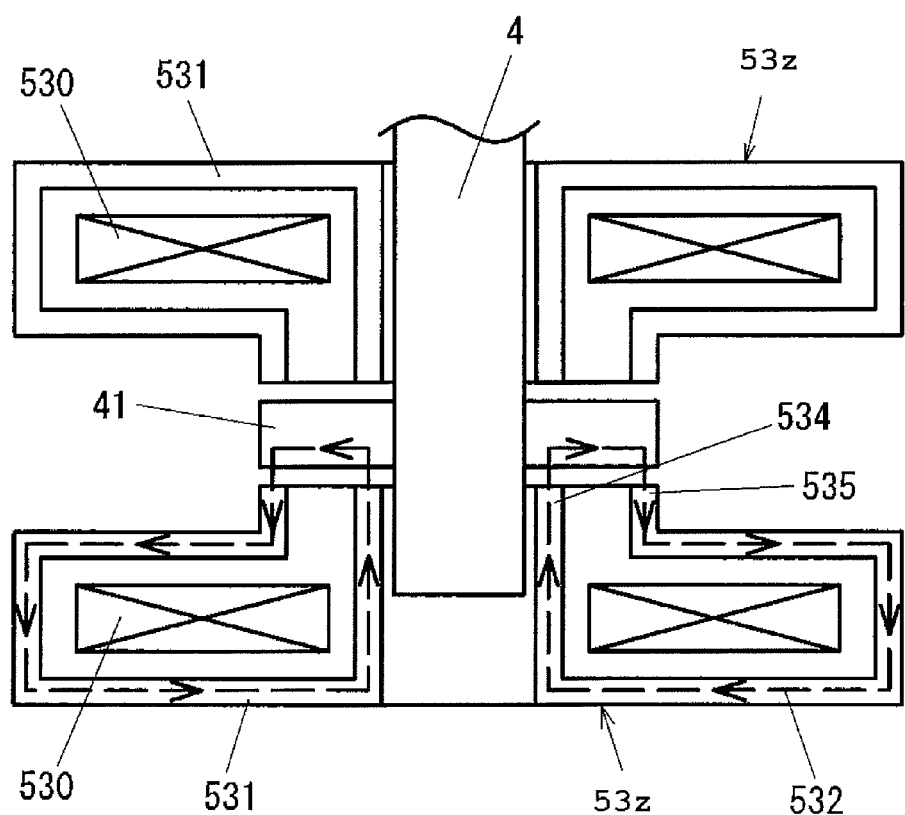
FIG. 10 is a diagram showing an axial magnetic bearing 53.
Figure 11:
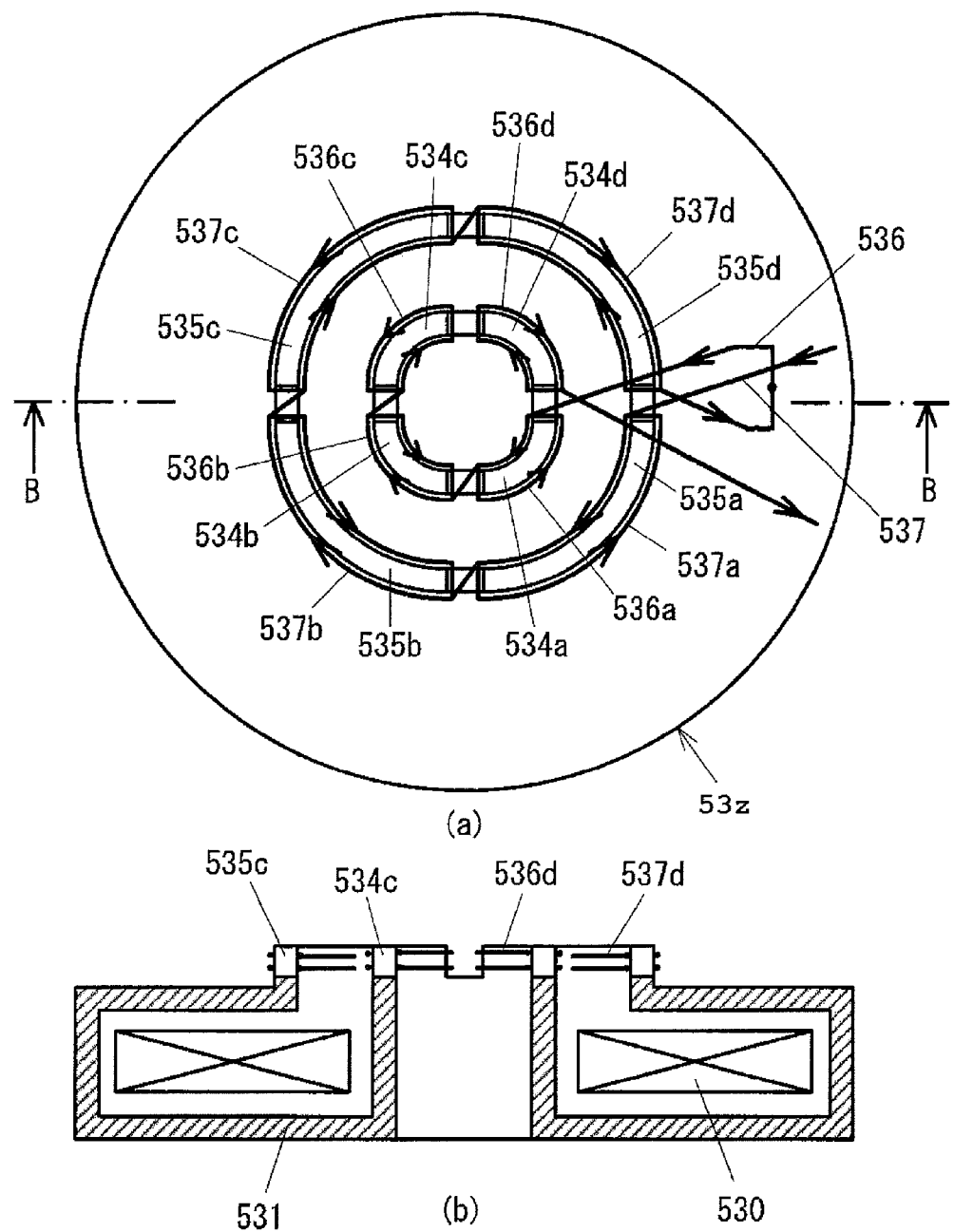
FIGS. 11(a) and 11(b) are diagrams showing the structure of an electromagnet 53z.

While the application of the invention to a radial magnetic bearing is described in the first embodiment above, an application to an axial magnetic bearing is described in the second embodiment. FIGS. 10 and 11 are diagrams illustrating the structure of the electromagnet 53z of the axial magnetic bearing 53, and FIG. 10 illustrates an enlarged portion of the axial magnetic bearing 53 of FIG. 1, where the illustration of a displacement sensor provided on the axial magnetic bearing 53 is omitted.

As shown in FIG. 10, the disk 41 is provided at the lower portion of the rotor shaft 4, and the pair of electromagnets 53z is provided so as to sandwich the disk 41 axially. The electromagnet 53z is provided with an electromagnetic coil 530 formed in a ring shape and a core (iron core) 531 formed so as to receive the electromagnetic coil 530. The core 531 is provided with magnetic poles 534 and 535 formed on the side facing the disk 41. When the electromagnet current is passed through the electromagnetic coil 530, magnetic flux 532 shown by dashed arrows is formed. The magnetic flux 532 flows from the magnetic pole 534 of the core 531 into the disk 41, passes through the disk 41, and then returns to the magnetic pole 535 of the core 531.

FIG. 11 illustrates the structure of the electromagnet 53z, where FIG. 11(a) is a plan view and FIG. 11(b) is a B-B cross-sectional view. The electromagnet 53z has a circular shape, and the magnetic poles 534 and 535 have a circular (or concentric) shape. The magnetic poles 534 and 535 include a plurality of divided magnetic poles arranged in a circular shape, and secondary coils 536 and 537 are wound around the magnetic poles 534 and 535, respectively.

In the example shown in FIG. 11, the magnetic pole 534 includes four divided magnetic poles 534a-534d having the same shape and the magnetic pole 535 includes four divided magnetic poles 535a-535d having the same shape. The secondary coil 536 includes four split secondary coils 536a-536d connected in series. The split secondary coils 536a-536d are wound around the corresponding divided magnetic poles 534a-534d, respectively. Likewise, the secondary coil 537 includes four split secondary coils 537a-537d connected in series, and the split secondary coils 537a-537d are wound around the corresponding divided magnetic poles 535a-535d, respectively. In addition, the secondary coils 536 and 537 are connected in series.

Figure 12:
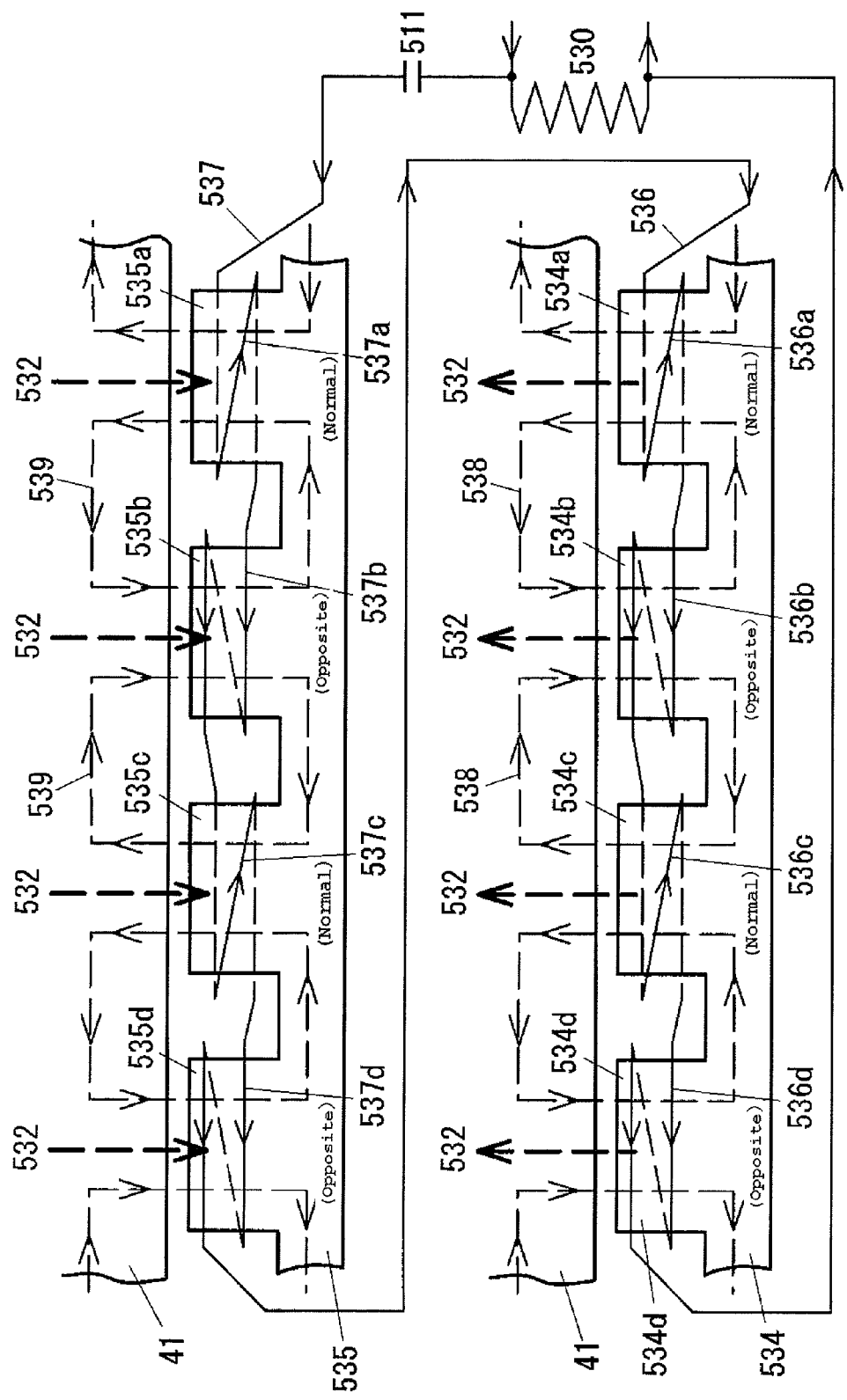
FIG. 12 is a schematic diagram showing the connection of an electromagnetic coil 530 and secondary coils 536, 537.

FIG. 12 is a schematic diagram illustrating the connection of the electromagnetic coil 530 and the secondary coils 536, 537, where the magnetic poles 534, 535 are shown expanded in the circumferential direction. The axial magnetic bearing 53 also has a structure similar to the winding circuit configuration shown in FIG. 8. That is, the electromagnetic coil 530 corresponds to the primary coil (split primary coils 5101, 5102) and the secondary coils 536, 537 correspond to the secondary coil (split secondary coils 5103-5106).

The secondary coil 536 includes an even number of split secondary coils 536a, 536b, 536c, and 536d, where odd-numbered split secondary coils (536a, 536c) and even-numbered split secondary coils (536b, 536d) are wound oppositely to each other. Thus, magnetic flux 538 produced by the secondary coil 536 forms a closed loop by following a path of odd-numbered divided magnetic pole, disk 41, even-numbered divided magnetic pole, magnetic pole 534, odd-numbered divided magnetic pole in this order.

Likewise, the secondary coil 537 includes an even number of split secondary coils 537a, 537b, 537c, and 537d, where odd-numbered split secondary coils (537a, 537c) and even-numbered split secondary coils (537b, 537d) are wound oppositely to each other. Thus, magnetic flux 539 produced by the secondary coil 537 forms a closed loop by following a path of odd-numbered divided magnetic pole, disk 41, even-numbered divided magnetic pole, magnetic pole 535, odd-numbered divided magnetic pole in this order.

On the other hand, the magnetic flux 532 produced by the primary coil or the electromagnetic coil 530 forms a closed loop by following a path of magnetic pole 534 (divided magnetic poles 534a-534d), disk 41, magnetic pole 535 (divided magnetic poles 535a-535d), core 531, magnetic pole 534 (divided magnetic poles 534a-534d) in this order. Thus, as with the winding circuit configuration shown in FIG. 8, induced electromotive forces to a change in the magnetic flux 532 are oppositely directed in the odd-numbered split secondary coils (536a, 536c) and the even-numbered split secondary coils (536b, 536d). The same is true about the relationships between the magnetic flux 532 and the odd-numbered split secondary coils (537a, 537c) and the even-numbered split secondary coils (537b, 537d). Consequently, the effect of the magnetic flux 532 on the split secondary coils 536a, 536c, 536b, 536d and the effect of the magnetic flux 532 on the split secondary coils 537a, 537c, 537b, 537d can be zero. In other words, the mutual inductance between the electromagnetic coil 530 and the secondary coils 536, 537 can be zero.

(1) As described above, the present embodiments includes: the electromagnet (e.g., 51xP, 51xM) for magnetically levitating the rotor 30 as a supported member using magnetic force; the electromagnet drive circuit 61a for supplying, to the electromagnet, the electromagnet current including the magnetic levitation control current component for magnetically levitating the rotor 30 and the carrier current component for detecting a levitation position of the rotor 30, the carrier current component having a higher frequency band than the magnetic levitation control current component; and the levitation position detecting circuit (current detection circuits 62a, 62b, detector circuits 66a, 66b, and differentiator 67) for detecting the modulated carrier current component signal to generate the levitation position signal of the rotor 30; and the magnetic levitation control circuit 63 for inputting a current command of the magnetic levitation control current component to the electromagnet drive circuit 61a based on the levitation position signal. As shown in FIG. 8, the electromagnet includes the core 512 having the pair of magnetic poles 512a, 512b; the primary coil (5101, 5102) wound around the core 512; and the series circuit of the first secondary coil (5103, 5104) wound around the first magnetic pole 512a of the core 512, the second secondary coil (5105, 5106) wound around the second magnetic pole 512b of the core 512, and the capacitor 511, the primary coil (5101, 5102) and the series circuit being connected in parallel. The first magnetic pole 512a is divided into the plurality of divided magnetic poles 5123, 5124 and the second magnetic pole 512b is divided into the plurality of divided magnetic poles 5125, 5126. Furthermore, the first secondary coil includes the plurality of split secondary coils 5103, 5104 wound around the plurality of divided magnetic poles 5123, 5124, respectively, of the first magnetic pole 512a so that the mutual inductance with the primary coil becomes zero. The second secondary coil includes the plurality of split secondary coils 5105, 5106 wound around the plurality of divided magnetic poles 5125, 5126, respectively, of the second magnetic pole 512b so that the mutual inductance with the primary coil becomes zero.

Accordingly, even if the primary coil 510a is configured in the same manner as a conventional sensorless magnetic levitation device or non-sensorless magnetic levitation device, the carrier current component flows through the line of the secondary coil 510b, so that the carrier current component can be increased more than the conventional sensorless magnetic levitation device.

Furthermore, the first and second secondary coils are configured with the split secondary coils 5103-5106 described above so that the mutual inductance with the primary coil becomes zero, which can prevent the degradation of position detection sensitivity due to interference between the magnetic flux from the primary coil and the magnetic flux from the secondary coil.

(2) Note that, two divided magnetic poles are formed for a single magnetic pole in the first embodiment above and four divided magnetic poles are formed for a single magnetic pole in the second embodiment, but the number of divisions is not limited to them. That is, the first and second secondary coils (e.g., secondary coils 536, 537 of FIG. 12) may be those that have the same number of split secondary coils and split secondary coils wound in the direction opposite to that of the above split secondary coils where the split secondary coils and the split secondary coils wound in the opposite direction are alternately connected in series.

(3) The capacitance C of the capacitor 511 is preferably set so as to satisfy inequalities $(1/2\pi f_1 C) > 2\pi f_1 L_M$ and $(1/2\pi f_2 C) < 2\pi f_2 L_M$, where the inductance of the primary coil, the frequency of the magnetic levitation control current component, and the frequency of the carrier current component are $L_M$, $f_1$, and $f_2$, respectively. With such a setting, the magnetic levitation control current component having the frequency $f_1$ contributing to levitation force flows substantially only through the primary coil 510a in the frequency band for the magnetic levitation control, and thus the magnetic levitation control is performed in the conventional manner, which may reduce the effect on the magnetic levitation control while at the same time increasing the carrier current component.

(4) Moreover, since the inductance of the secondary coil 510b is set to be equal to or less than the inductance of the primary coil 510a, the secondary coil 510b will have a greater carrier current component.

(5) Additionally, the impedance $Z_{C1}$ of the capacitor 511 and the impedance $Z_{S1}$ of the secondary coil 510b, at the frequency $f_1$, are set such that $Z_{C1} < A^2 \cdot Z_{S1}$, where A is the ratio $f_2/f_1$ of the frequency $f_1$ and frequency $f_2$. This reduces the effect of the capacitance C on the secondary coil (Ls) at the frequency $f_2$.

The above description is merely an example, and the present invention is not intended to be limited to the embodiments described above as long as the features of the present invention are not impaired. For example, while the above embodiment is described with reference to a radial magnetic bearing, the present invention can be similarly applied to an axial magnetic bearing. The present invention can also be applied to sensorless levitation devices used in various applications, not limited to turbo-molecular pumps. Additionally, a control circuit may use digital processing as well as analog signal processing.

The disclosure of the following priority application is incorporated herein by reference:
Japanese Patent Application No. 2012-1403 (filed on Jan. 6, 2012).

The invention claims is:

1. A sensorless magnetic levitation vacuum pump comprising:
   a rotor provided with an exhaust function unit;
   a motor for rotating the rotor;
   an electromagnet for magnetically levitating the rotor using magnetic force;
   an electromagnet drive circuit for supplying, to the electromagnet, an electromagnet current including a magnetic levitation control current component for magnetically levitating the rotor and a carrier current component for detecting a levitation position of the rotor, the carrier current component having a higher frequency band than the magnetic levitation control current component;
   a levitation position detecting circuit for detecting the carrier current component to generate a levitation position signal of the rotor; and
   a magnetic levitation control circuit for inputting a current command of the magnetic levitation control current component to the electromagnet drive circuit based on the levitation position signal, wherein
   the electromagnet comprises a core having a pair of magnetic poles; a primary coil wound around the core; and a series circuit of a first secondary coil wound around the first one of the magnetic poles of the core, a second secondary coil wound around the second one of the magnetic poles of the core, and a capacitor, the primary coil and the series circuit being connected in parallel, and
   each of the first and second magnetic poles is divided into a plurality of divided magnetic poles, the first secondary coil comprising a plurality of split secondary coils wound around the plurality of divided magnetic poles, respectively, of the first magnetic pole so that the mutual inductance with the primary coil becomes zero, and the second secondary coil comprising a plurality of split secondary coils wound around the plurality of divided magnetic poles, respectively, of the second magnetic pole so that the mutual inductance with the primary coil becomes zero.

2. The sensorless magnetic levitation vacuum pump according to claim 1, wherein
the first secondary coil has first split secondary coil and second split secondary coil wound in a direction opposite to that of the first split secondary coil, the first split secondary coil and the second split secondary coil being identical in number and being alternately connected in series, and
the second secondary coil has third split secondary coil and fourth split secondary coil wound in a direction opposite to that of the third split secondary coil, the third split secondary coil and the fourth split secondary coil being identical in number and being alternately connected in series.

3. The sensorless magnetic levitation vacuum pump according to claim 1, wherein
the capacitance C of the capacitor is set so as to satisfy inequalities $(1/2\pi f_2 C) > 2\pi f_1 L_M$ and $(1/2\pi f_2 C) < 2\pi f_2 L_M$, where the inductance of the primary coil, a frequency of the magnetic levitation control current component, and the frequency of the carrier current component are $L_M$, $f_1$, and $f_2$, respectively.

4. The sensorless magnetic levitation vacuum pump according to claim 3, wherein
the inductance of the first secondary coil and the second secondary coil connected in series is set to be equal to or less than the inductance of the primary coil.

5. The sensorless magnetic levitation vacuum pump according to claim 3, wherein
the impedance $Z_{C1}$ of the capacitor and the impedance $Z_{S1}$ of the first secondary coil and the second secondary coil connected in series, at the frequency $f_1$, are set such that an inequality $Z_{C1} < A^2 \cdot Z_{S1}$ is satisfied, where A is the ratio $f_2/f_1$ of the frequency $f_1$ and the frequency $f_2$.

6. A sensorless magnetic levitation device comprising:
an electromagnet for magnetically levitating a supported member using magnetic force;
an electromagnet drive circuit for supplying, to the electromagnet, an electromagnet current including a magnetic levitation control current component for magnetically levitating the supported member and a carrier current component for detecting a levitation position of the supported member, the carrier current component having a higher frequency band than the magnetic levitation control current component;
a levitation position detecting circuit for detecting the carrier current component to generate a levitation position signal of the supported member; and
a magnetic levitation control circuit for inputting a current command of the magnetic levitation control current component to the electromagnet drive circuit based on the levitation position signal, wherein
the electromagnet comprises a core having a pair of magnetic poles; a primary coil wound around the core; and a series circuit of a first secondary coil wound around the first one of the magnetic poles of the core, a second secondary coil wound around the second one of the magnetic poles of the core, and a capacitor, the primary coil and the series circuit being connected in parallel,
each of the first and second magnetic poles is divided into a plurality of divided magnetic poles,
the first secondary coil comprises a plurality of split secondary coils wound around the plurality of divided magnetic poles, respectively, of the first magnetic pole so that the mutual inductance with the primary coil becomes zero, and
the second secondary coil comprises a plurality of split secondary coils wound around the plurality of divided magnetic poles, respectively, of the second magnetic pole so that the mutual inductance with the primary coil becomes zero.

7. The sensorless magnetic levitation device according to claim 6, wherein
the first secondary coil has first split secondary coil and second split secondary coil wound in a direction opposite to that of the first split secondary coil, the first split secondary coil and the second split secondary coil being identical in number and being alternately connected in series, and
the second secondary coil has third split secondary coil and fourth split secondary coil wound in a direction opposite to that of the third split secondary coil, the third split secondary coil and the fourth split secondary coil being identical in number and being alternately connected in series.

8. The sensorless magnetic levitation device according to claim 7, wherein
the capacitance C of the capacitor is set so as to satisfy inequalities $(1/2\pi f_1 C) > 2\pi f_1 L_M$ and $(1/2\pi f_2 C) < 2\pi f_2 L_M$, where the inductance of the primary coil, a frequency of the magnetic levitation control current component, and the frequency of the carrier current component are $L_M$, $f_1$, and $f_2$, respectively.

* * * * *